July 5, 1932.  W. A. JOHNSTON  1,865,915
COMBINED SOFT COLLAR STIFFENER AND TIE SUPPORT
Filed June 7, 1930
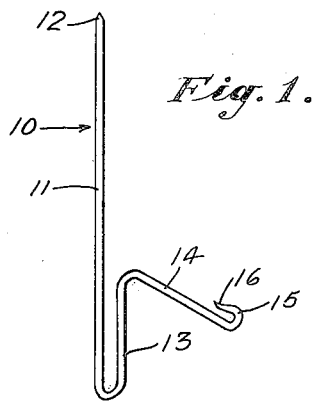
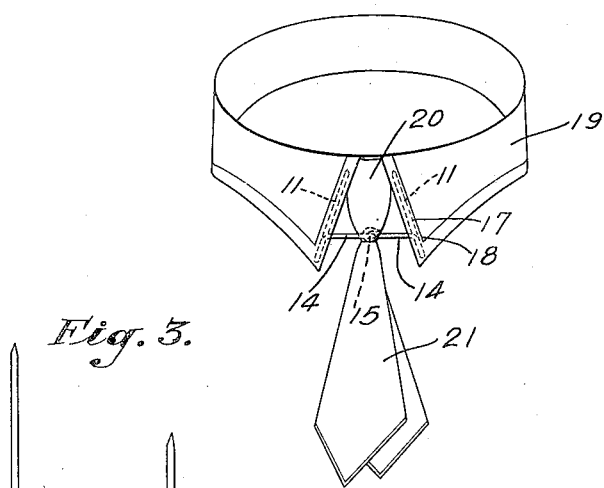
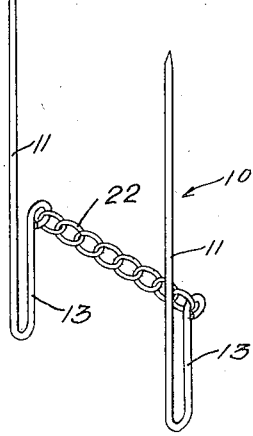
INVENTOR:
William A. Johnston
By
ATTORNEY.

Patented July 5, 1932

1,865,915

UNITED STATES PATENT OFFICE

WILLIAM A. JOHNSTON, OF LOS ANGELES, CALIFORNIA, ASSIGNOR OF ONE-HALF TO SPARROW E. PURDY, OF CHICAGO, ILLINOIS

COMBINED SOFT COLLAR STIFFENER AND TIE SUPPORT

Application filed June 7, 1930. Serial No. 459,766.

My invention relates to a collar stiffener, and more particularly to a form of collar stiffener adapted to hold the points of a soft collar in a semi-rigid condition and proper spacial relationship with each other, and to hold the knot of a tie in the proper position with respect to the points of the collar.

There is a tendency in all collars other than heavily starched collars for the points to curl and assume an unsightly position. It is the purpose of my invention to provide a means for so stiffening the points of a collar that they will remain straight and sightly.

It is desirable that if an element is inserted into the collar, it should be inserted in such a way as to be invisible and damage the material as little as possible. It is a corresponding object of my invention to provide a collar stiffener in which an element is adapted to be inserted in a seam of each point of a collar, this element, when inserted, being invisible.

It is desirable that the collar stiffener when applied to a collar should be so attached that it will not become easily disengaged. It is therefore a further object of my invention to provide a collar stiffener as described which will not be disengaged by the movements of the wearer.

It is also desirable that the points of a collar should be so connected as to maintain them in proper spacial relationship with each other and to retain the knot of a necktie in an elevated position relative to the points of the collar. It is a corresponding object of my invention to provide a combined collar stiffener and tie support which is adapted to so connect the points of a collar as to maintain them in the proper spacial relationship with each other and to retain the knot of the necktie elevated with respect to the points of the collar.

Referring to the drawing, in which I have illustrated a preferred form and an alternative form of my invention, Fig. 1 is a perspective view of one-half of the combined soft collar stiffener and tie support of my invention.

Fig. 2 is a utility view illustrating the appearance of my invention as it is worn in a collar; and Fig. 3 is a perspective view illustrating a modified form of my invention.

Referring to the drawing, and particularly to Fig. 1, there is illustrated a pin 10, preferably made of cylindrical wire, which comprises one-half of the collar stiffening and tie supporting device of my invention. As shown in Fig. 1, the pin 10 includes a shank 11, the upper end of which is formed with a point 12. At its lower end the shank 11 is bent to an angle of substantially 180° to form a return or reverse portion 13. The reverse portion 13 extends substantially parallel to the shank 11 for a portion of the length of the shank and is then bent to form an extension 14 substantially normal to the plane of the shank 11 and the reverse portion 13. The end of the extension 14 is bent to form a hook means 15 which includes a finger 16. As illustrated in the drawing, the finger 16 is adjacent to the extension 14 and separated therefrom a distance slightly less than the diameter of the wire from which the extension 14 and the hook 15 are made.

The pin 10 of my invention is adapted to be used as follows: The point 12 is inserted near the lower end of a seam 17 at the front of a point 18 of a collar 19, the point 12 being inserted from the under side of the point 18. The entire shank 11 of the pin 10 is forced upwardly in the seam 17 until the bend in the pin 10 between the shank 11 and the reverse portion 13 prevents the further penetration of the pin. The reverse portion 13 is so bent upon the shank 11 of the pin 10 as to cause a portion of the point 18 of the collar 19 to be frictionally engaged by the shank 11 and reverse portion 13. As is quite apparent, the special relationship between the reverse portion 13 and the shank 11 may be easily varied so that a frictional engagement of the point 18 sufficient to retain the pin 10 in its proper position on the point 18 may be secured. When one of the pins 10 has been inserted in each of the points 18 of the collar 19, the extensions 14 will extend toward each other and under a knot 20 of a necktie 21. The hooks 15 are now to be placed in engagement one with the other. Inasmuch as the space between the finger 16 and the extension 14 on which the hook is formed is slightly less than the diameter of the wire from which the extension 14 and hook 15 are made, it will require a slight pressure to cause the finger 16 to separate from the extension 14 a sufficient distance on one or both of the hooks 15 to permit their engagement. Immediately after this engagement, the finger 16 will resume its former position relative to the extension 14, due to the resiliency of the material from which the hook 15 is formed.

As is illustrated in Fig. 2, the shank 11 of each of the pins 10 is of such a length as to stiffen the entire point 18 of the collar 19. The reverse portion 13 is made of such a length that the associated extension 14 will be almost completely hidden by the knot 20 of the necktie 21. The extensions 14 are of such a length that when the hooks 15 are engaged, the points 18 of the collar 19 will be held in the proper special relationship with each other. Because of the slight force required to engage or disengage the hooks 15, as already explained, there will be no tendency for the hooks 15 to disengage each other until a slight pressure is exerted on them by the wearer. The length of the extensions 14 being such that they are in a slight tension, the extensions 14 will tend to align with each other and contact the under surface of the knot 20 of the necktie 21, thus elevating it with respect to the points 18 of the collar 19.

When it is desired to remove my collar stiffening and tie supporting device, it is necessary only to exert a slight pressure upon the extensions 14 toward the engagement hooks 15. This slight pressure will cause the finger 16 of one or both of the hooks 15 to separate sufficiently from the extension 14 to permit the disengagement of the hooks 15, whereupon the wearer by grasping the reverse portions 13 or the extensions 14 and exerting a downward pull thereon can easily remove the pins 10 from the collar 19.

A modified form of my invention, as illustrated in Fig. 3, in which like numerals indicate the elements which are the same as those illustrated in Figs. 1 and 2, is provided with a chain 22 instead of the extensions 14 illustrated in the preferred form of my invention. As illustrated in the drawing, the chain 22 connects the reverse portions 13 and serves the same function of retaining the points 18 of the collar 19 in proper spacial relationship and supporting the knot 20 of the necktie 21, as do the extensions 14 in the embodiment of my invention previously described. The chain 22 may be in one portion and fixedly attached at each of its ends to one of the reverse portions 13, as illustrated in Fig. 3; or the chain 22 may be in two portions adapted to be releasably connected together under the knot 20 of the necktie 21, without departing from the scope of my invention.

It should be apparent that the shank 11 of the pin 10 will retain the points 18 of the collar 19 in a semi-rigid condition. It should likewise be apparent that the frictional engagement of the reverse portion 13 with the point 18 of the collar will retain the pin 10 in its proper position on the collar 19 and that while in such position the shank 11 and reverse portion 13 of the pin 10 are invisible. It is equally obvious that the extensions 14 when the hooks 15 are in engagement, or the chain 22, as illustrated in the alternative form of my invention, will retain the points 18 of the collar 19 in the proper spacial relationship with each other and will be contacting the under side of the knot 20 of the necktie 21, retaining it in elevated position relative to the points 18 of the collar 19.

While I have illustrated and described the preferred and a modified form of embodiment of my invention, I do not wish to be restricted to them, for there are other embodiments of my invention capable of performing the objects and purposes primarily stated, all coming within the scope of the claims which follow.

I claim as my invention:

1. In combination with a collar as a collar stiffening device, the combination of: a shank inserted at the lower end of the collar edge; and a reverse portion attached to said shank and contacting the surface of said edge.

2. In combination with a collar as a collar stiffening device, the combination of: a shank inserted at the lower end of the collar edge; and a reverse portion attached to said shank and frictionally engaging the surface of said edge.

3. In combination with a collar and necktie, as a collar stiffening and tie supporting device, the combination of: a shank inserted at the lower end of the collar edge; a reverse portion attached to said shank and engaging the surface of said edge; and an extension attached to said reverse portion and extending under said tie.

4. In combination with a collar and necktie, as a collar stiffening and tie supporting device, the combination of: a shank inserted at the lower end of each point of said collar; a return portion attached to each of said shanks and contacting the surface of one of said points; and inter-engaging means connecting said return portions.

5. In combination with a collar and necktie, as a collar stiffening and tie supporting device, the combination of: a shank inserted at the lower end of each point of said collar; a reverse portion attached to each of said shanks and contacting the surface of one of said points; and inter-engaging means releasably connecting said reverse portions.

6. In combination with a collar and necktie, as a collar stiffening and tie supporting device, the combination of: a shank inserted at the lower end of each point of said collar; a reverse portion attached to each of said shanks and contacting the surface of one of said points; and rigid inter-engaging means connecting said reverse portions.

7. In combination with a collar and necktie, as a collar stiffening and tie supporting device, the combination of: a shank inserted at the lower end of each point of said collar; a reverse portion attached to each of said shanks and contacting the surface of one of said points; and rigid inter-engaging means releasably connecting said reverse portions.

8. In combination with a collar and necktie, as a collar stiffening and tie supporting device, the combination of: shanks inserted at the lower ends of the collar edges; a reverse portion attached to each of said shanks and frictionally engaging the surface of one of said ends; and an extension attached to each reverse portion, said extensions being connected to each other.

9. In combination with a collar and necktie, as a collar stiffening and tie supporting device, the combination of: a shank inserted at the lower end of each point of said collar; a reverse portion attached to each of said shanks and frictionally engaging the surface of one of said points; and an extension attached to each reverse portion, said extensions being releasably connected to each other under said tie.

10. In combination with a collar and necktie, as a collar stiffening and tie supporting device, the combination of: a shank inserted at the lower end of each point of said collar; a reverse portion attached to each of said shanks and frictionally engaging the surface of one of said points; and an extension attached to each reverse portion, each of said extensions having hook means thereon adapted to engage hook means on the other of said extensions.

11. In combination with a collar and necktie, as a collar stiffening and tie supporting device, the combination of: a shank inserted at the lower end of each point of said collar; a reverse portion attached to each of said shanks and frictionally engaging the surface of one of said points; an extension attached to each of said reverse portions; and a hook attached to each of said extensions, said hooks being adapted to engage each other and to resiliently resist their disengagement.

12. In combination with a collar and necktie, as a collar stiffening and tie supporting device, the combination of: a shank inserted at the lower end of each point of said collar, the upper end of said shank being pointed; a reverse portion attached to each of said shanks and frictionally engaging the surface of one of said points; an extension attached to each of said reverse portions; and a hook attached to each of said extensions, said hooks being adapted to engage each other and to resiliently resist their disengagement.

13. In combination with a collar and necktie, as a collar stiffening and tie supporting device, the combination of: a pair of wires, each having a shank inserted at the lower end of a point of said collar, a reverse portion bent on the lower end of said shank substantially parallel with said shank to frictionally engage the surface of the point of said collar, and an extension bent on said reverse portion, said extension having a hook bent on its end resiliently resisting engagement or disengagement with the hook formed on said other wire, said hooks engaging under said tie.

In testimony whereof, I have hereunto set my hand at Los Angeles, California, this 3rd day of June, 1930.

WILLIAM A. JOHNSTON.